United States Patent
Hanson et al.

(10) Patent No.: US 12,351,181 B2
(45) Date of Patent: Jul. 8, 2025

(54) ROADSIDE INFRASTRUCTURE DETECTION, LOCALIZATION, AND MONITORING

(71) Applicant: FORD GLOBAL TECHNOLOGIES, LLC, Dearborn, MI (US)

(72) Inventors: Ryan E. Hanson, Livonia, MI (US); Vivekanandh Elangovan, Canton, MI (US); John R. Van Wiemeersch, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 457 days.

(21) Appl. No.: 17/569,021

(22) Filed: Jan. 5, 2022

(65) Prior Publication Data
US 2023/0211787 A1    Jul. 6, 2023

(51) Int. Cl.
*B60W 40/02* (2006.01)
*B60W 50/10* (2012.01)
(Continued)

(52) U.S. Cl.
CPC ............ *B60W 40/02* (2013.01); *B60W 50/10* (2013.01); *B60W 50/14* (2013.01);
(Continued)

(58) Field of Classification Search
CPC ...... B60W 40/02; B60W 50/10; B60W 50/14; B60W 2420/403; B60W 2420/408;
(Continued)

(56) References Cited

U.S. PATENT DOCUMENTS

| 6,621,448 B1 * | 9/2003 | Lasky .................. G01V 3/12 |
| | | 342/27 |
| 7,421,334 B2 | 9/2008 | Dahlgren et al. |

(Continued)

FOREIGN PATENT DOCUMENTS

| JP | 2010231400 A * 10/2010 |
| KR | 20110094986 A * 8/2011 |

OTHER PUBLICATIONS

"Donecker, S; Yen, K; Baumeister, L; Ravani, B; Lasky, T; Evaluation of Current Technologies and Development of Novel Techniques for Detection of Obstacles Buried in Snow; Apr. 30, 2008; AHMCT Research Center Work Unit No. (TRAIS) UCD Dept of Mechanical & Aerospace Engineering" (Year: 2008).*

(Continued)

*Primary Examiner* — Ramya P Burgess
*Assistant Examiner* — Christopher R Cardimino
(74) *Attorney, Agent, or Firm* — Frank L. Lollo; MacMillan, Sobanski & Todd, LLC

(57) ABSTRACT

Surface penetrating radar interrogates a region adjacent a pathway of the vehicle in response to activation by a user. An object detection system which is responsive to the radar transceiver is configured to recognize one or more spatial signatures of one or more detected objects in the region. A controller coupled to the radar transceiver and the object detection system is configured to (i) compare a respective spatial signature of at least one of the detected objects to a plurality of predetermined target signatures to detect an infrastructure asset, (ii) assess a perimeter around the detected infrastructure asset to estimate a severity of an obstruction blocking the infrastructure asset, and (iii) convey an alert message to the user when the estimated severity is greater than a threshold.

20 Claims, 4 Drawing Sheets

(51) Int. Cl.
  *B60W 50/14* (2020.01)
  *G01C 21/34* (2006.01)
  *G01S 7/41* (2006.01)
  *G01S 13/02* (2006.01)
  *G01S 13/88* (2006.01)
  *G06V 20/58* (2022.01)
  *G08G 1/0962* (2006.01)
  *G08G 1/16* (2006.01)
  *H04W 4/48* (2018.01)

(52) U.S. Cl.
  CPC .......... *G01C 21/3492* (2013.01); *G01S 7/412* (2013.01); *G01S 13/0209* (2013.01); *G01S 13/885* (2013.01); *G06V 20/58* (2022.01); *G08G 1/09626* (2013.01); *G08G 1/166* (2013.01); *B60W 2420/403* (2013.01); *B60W 2420/408* (2024.01); *B60W 2554/20* (2020.02); *B60W 2554/80* (2020.02); *B60W 2756/00* (2020.02); *H04W 4/48* (2018.02)

(58) Field of Classification Search
  CPC .......... B60W 2554/20; B60W 2554/80; G01C 21/3492; G01S 7/412; G01S 13/0209; G01S 13/885; G06V 20/58; G08G 1/09626; G08G 1/166
  See application file for complete search history.

(56) References Cited

U.S. PATENT DOCUMENTS

| | | | | |
|---|---|---|---|---|
| 8,711,028 | B2* | 4/2014 | Paglieroni | G01V 3/15 |
| | | | | 342/25 R |
| 8,779,965 | B2* | 7/2014 | Sentelle | G01V 3/12 |
| | | | | 242/129 |
| 8,949,024 | B2 | 2/2015 | Stanley et al. | |
| 9,649,979 | B2* | 5/2017 | Sakai | B60W 40/00 |
| 9,672,713 | B2* | 6/2017 | Beggs | G08G 1/005 |
| 9,718,404 | B2* | 8/2017 | Nallapa | B60W 30/09 |
| 9,746,573 | B1* | 8/2017 | Olsson | G01V 3/15 |
| 10,204,517 | B2* | 2/2019 | Varoglu | H04B 17/318 |
| 10,366,605 | B1* | 7/2019 | Hayward | H04L 67/12 |
| 10,552,689 | B2* | 2/2020 | Doria | G01S 17/89 |
| 10,814,736 | B2* | 10/2020 | Van Wiemeersch | B60L 53/66 |
| 10,852,921 | B2 | 12/2020 | Kennedy | |
| 11,391,819 | B2* | 7/2022 | Sarkis | G01S 7/417 |
| 12,123,999 | B1* | 10/2024 | Olsson | G01V 3/16 |
| 2008/0117098 | A1* | 5/2008 | Johnson | G01S 13/90 |
| | | | | 342/25 F |
| 2018/0038694 | A1 | 2/2018 | Bruemmer et al. | |
| 2020/0079359 | A1* | 3/2020 | Tsujino | B60W 30/06 |
| 2020/0307403 | A1 | 10/2020 | Rastoll et al. | |
| 2021/0097860 | A1 | 4/2021 | Banome et al. | |

OTHER PUBLICATIONS

"Hollinger, J; Close, R; Ground vehicle based LADAR for standoff detection of road-side hazards; 2015; Land Sea Air Autonomy, LLC, Westminster, MD" (Year: 2015).*

"Shaw, A; Rahn, D; Depoy, R; Fusion of UHF-SAR with LIDAR Elevation for Precise Buried Object Detection; 2012; Electrical Engineering Department, Wright State University, Dayton, OH; Gitam Technologies, Dayton, Ohio" (Year: 2012).*

Katsuyuki Ohguchi, et al, 79GHz Band Ultra-Wideband Automotive Radar, Fujitsu Ten Tech, Journal No. 39 (2013).

* cited by examiner

ROADSIDE INFRASTRUCTURE DETECTION, LOCALIZATION, AND MONITORING

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to locating and monitoring roadside infrastructure assets, and, more specifically, to vehicle sensing and notification relating to potential obstruction of roadside infrastructure assets.

Public infrastructure assets often located curbside for easy accessibility along a roadway may include fire hydrants, communication exchanges, service boxes, access (e.g., manhole) covers, and other devices. Unimpeded access to such assets may be critical for emergency responders. For example, the effectiveness of actions taken by firefighters to deal with fires can be impacted by being able to locate and then utilize hydrants closest to the site of a fire. Any delays in connecting to a hydrant can result in unchecked growth of the fire. For example, during some phases of a building fire, the fire may double in size every 30 seconds. This may consequently increase property damage as well as the risks of fighting the fire.

Snow removal can be critically important because firefighters must be able to identify and quickly access a fire hydrant. Hydrants or other infrastructure assets may also be obstructed by leaves, trash, or improperly parked vehicles, for example. To reduce such problems, many States and cities have laws and regulations that follow the NFPA-1 standard (of the National Fire Protection Association) which calls for a 36-inch clear space to be maintained around the circumference of fire hydrants. Removal of snow and ice must occur promptly after a snowfall. Failure to follow any ordinances can result in warnings and then fines for property owners not complying with the requirements.

SUMMARY OF THE INVENTION

In one aspect of the invention, apparatus for a vehicle comprises a surface penetrating radar transceiver configured to interrogate a region adjacent a pathway of the vehicle in response to activation by a user. An object detection system which is responsive to the radar transceiver is configured to recognize one or more spatial signatures of one or more detected objects in the region. A controller coupled to the radar transceiver and the object detection system is configured to (i) compare a respective spatial signature of at least one of the detected objects to a plurality of predetermined target signatures to detect an infrastructure asset, (ii) assess a perimeter around the detected infrastructure asset to estimate a severity of an obstruction blocking the infrastructure asset, and (iii) convey an alert message to the user when the estimated severity is greater than a threshold.

DETAILED DESCRIPTION OF PREFERRED EMBODIMENTS

Figure 1:
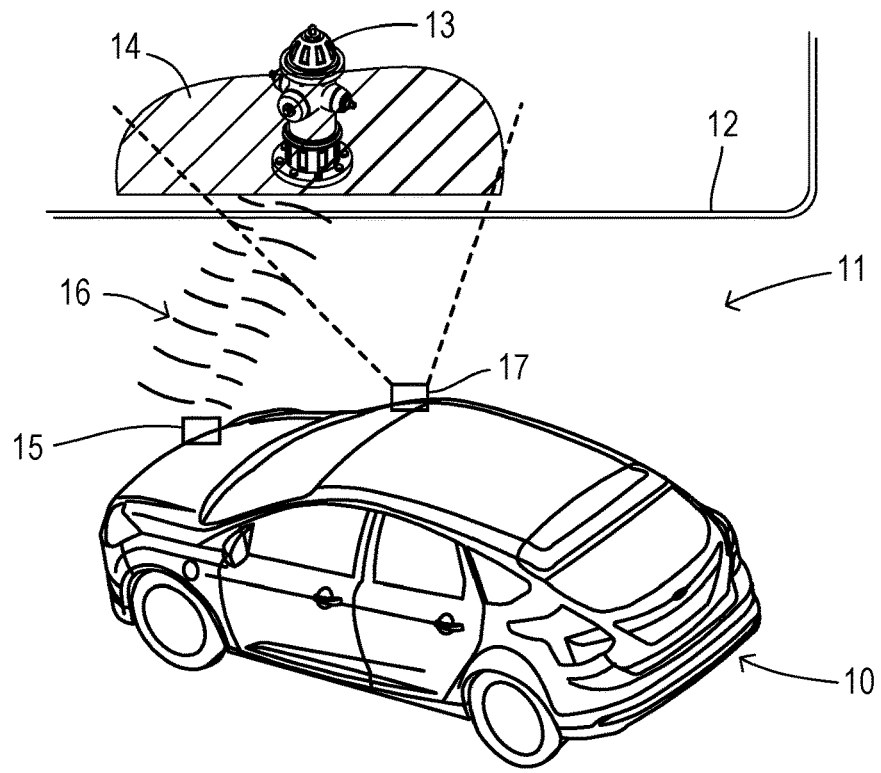
FIG. 1 is a schematic diagram showing vehicle interrogation of an infrastructure asset via radar and optical camera.

Vehicle-mounted radar systems (such as Ultra-Wide Band (UWB) radar units as commonly used in driver assistance systems) and perimeter camera systems are employed in some embodiments to detect infrastructure assets and to determine if roadside infrastructure is obstructed (i.e., blocked or otherwise obscured or compromised) such that clearing of surrounding debris, leaves, snow, refuse, or other objects may be necessary. Although emergency personnel may know the general GPS coordinates of hydrants to within 3-5 meters, that may not be sufficient for rapid discovery of the hydrant when covered by snow or other obstructions. Using UWB radar, the invention can provide responders with a precise location of a buried hydrant.

In some embodiments, the UWB radar acts as a midrange detector to identify/locate buried infrastructure while one or more vehicle perimeter cameras capture images which are analyzed to determine a severity of obstructions that may be present around the infrastructure asset. Detection of infrastructure assets can utilize predetermined templates corresponding to curbside infrastructure assets which are to be targeted. Templates may include infrastructure type and related information pertaining to accessibility requirements for that infrastructure, as well as information regarding removal of obstructions (e.g., an allowable height above ground level for snow accumulation and the size of a clearance zone around the asset). Based on the template information and the severity of obstructions detected, whether or not any clearing of obstructions is needed can be ascertained and a user can be informed accordingly (e.g., by user notification displayed in the vehicle or through a linked mobile app on a smartphone).

A database can be maintained to record the locations and conditions of detected assets for which a particular user may be responsible (e.g., a homeowner upon whose land a fire hydrant is located). When an asset is first detected, it may be added to the database according to a "Geofenced" area and/or according to Geotagging data which may allow the asset to be monitored in the future using only the optical cameras. In addition to recognition of actual snow or debris in optical images of the site of the infrastructure asset, the likelihood of obstructions to be removed can be estimated by predictive algorithms and/or forecast models used to determine whether ongoing weather events may cause obstruction that requires clearing.

The UWB radar system can also be used to align the vehicle with the infrastructure by providing visual or audible commands or prompts to the operator indicating alignment with a vehicle reference point. In an autonomous vehicle (AV), a self-driving mode may take control of vehicle movements in order to automatically align the vehicle to the infrastructure asset. The UWB radar may be used to detect the distance (e.g., forward distance and/or lateral distance) of the vehicle reference point to the infrastructure asset, and the resulting distance can be conveyed to the user either through a vehicle display screen, a linked app on a mobile device, or guidance signals to a driver (e.g., flashing lights on vehicle interior or exterior lamps, or beeps or chirps from sound transducers on the vehicle to indicate an aligned position).

Referring to FIG. 1, a vehicle 10 is shown traveling on a roadway 11 having a curb 12 along one side. A curbside infrastructure asset 13 is represented as a fire hydrant. Hydrant 13 may be at least partially obscured by obstruction 14. Obstruction 14 may include snow, ice, leaves, vegetation, debris, and/or other objects. Vehicle 10 includes a surface penetrating radar transceiver system 15 configured to interrogate selected regions around vehicle 10 using radar pulses 16. Radar system 15 may be comprised of an Ultra-Wideband (UWB) radar module. Other types of surface penetrating radar systems can be used including pulsed radar and frequency modulated continuous wave using various allocated frequency bands (e.g., at 77 GHz and 24 GHz). Radar system 15 may perform both an infrastructure detection function of this invention together with other monitoring functions. Existing automotive radar components can be adapted to add monitoring for infrastructure assets. Examples include blind spot monitoring by a blind spot information system (BLIS) and collision waring by cross traffic alert (CTA) systems.

UWB radar systems are commercially available for motor vehicle use (e.g., used for vehicle functions such as adaptive cruise control and autonomous emergency braking). UWB radar employs very short duration pulses which enables high resolution of surfaces and which supports recognition of multiple reflections along a vector to detect surfaces covered (i.e., obscured) by other reflective surfaces. Vehicle 10 also includes an optical image sensor (e.g., camera) 17 for capturing images which coincide with the regions interrogated by radar system 15.

Figure 2:
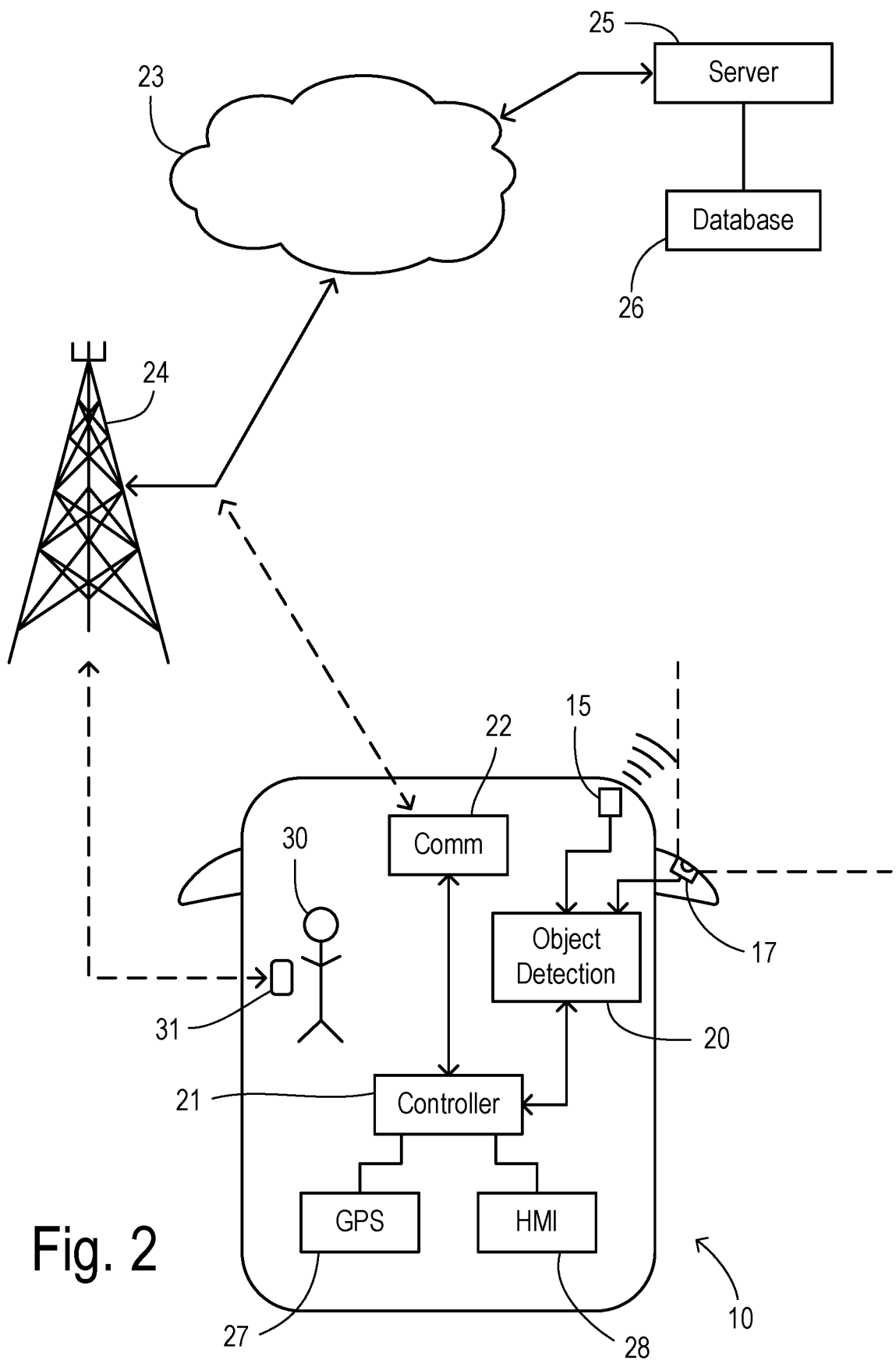
FIG. 2 is a block diagram showing an infrastructure detection and monitoring system.

A system for locating and monitoring infrastructure assets is shown in greater detail in FIG. 2. Radar transceiver 15 and camera 17 mounted on vehicle 10 are coupled to an object detection system 20 which is configured to recognize one or more spatial signatures of one or more detected objects in the region interrogated by radar transceiver 15 and/or camera 17. Object detection system 20 may be a separate electronic module, or may be incorporated in full or in part with radar transceiver 15 and/or with a controller 21. Controller 21 is configured to compare respective spatial signatures of objects detected by object detection system 20 to a plurality of predetermined target signatures to detect infrastructure assets. Controller 21 assesses a perimeter around the detected infrastructure asset to estimate a severity of any obstructions blocking the infrastructure asset. For example, camera 17 captures an image directed to the detected infrastructure asset, and the object detection system is configured to recognize the obstruction in response to the captured image. If the estimated severity is greater than a threshold, then controller 21 conveys an alert message to the user. As explained below, the threshold may be determined according to the type of infrastructure asset which is detected.

Controller 21 is coupled to a communications transceiver 22 which exchanges network messages with a cloud network 23 via a wireless communication system 24. Communication system 24 may be comprised of a cellular data network, a WiFi network, and/or a V2X system (e.g., WLAN or cellular based V2X). A network server 25 and a database 26 are coupled to cloud network 23 for implementing a support service with offboard resources for sharing data regarding aspects of infrastructure assets (e.g., spatial signatures, requirements for maintaining open access, and/or known locations of infrastructure assets previously established). Controller 21 is further coupled to a location monitoring system 27 (e.g., a GPS system) and a human-machine interface 28 (e.g., a touchscreen display panel).

A user 30 may include a driver or owner of vehicle 10, for example. User 30 can activate various aspects of the infrastructure asset locating and monitoring functions using HMI 28 and/or using a portable communication device 31 (e.g., a tablet or smartphone executing an app). Portable device 31 may have a wireless link with controller 21 and/or server 25. The wireless link(s) may be made directly (e.g., a WiFi connection with controller 21 via transceiver 22) or through wireless communication system 24. The aspects controlled by user 30 may include selecting/confirming infrastructure assets to be monitored, establishing a geofence to be stored in association with an infrastructure asset, requesting guidance for positioning vehicle 10 in a specified alignment with the infrastructure asset(s), and acknowledging alert messages that may be sent to HMI 28 and/or portable device 31 when an infrastructure asset is obstructed.

Figure 3:
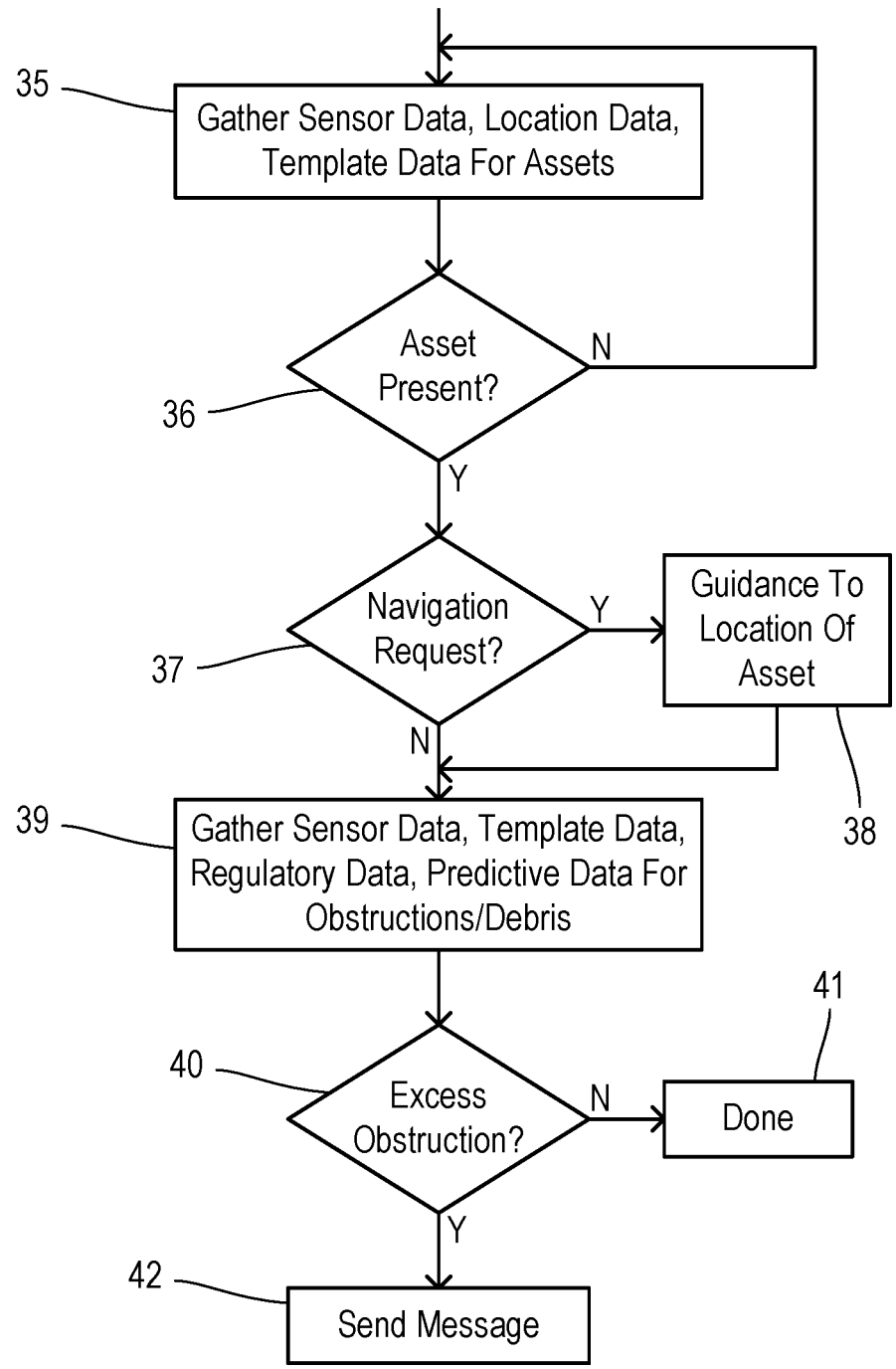
FIG. 3 is a flowchart showing one preferred method of the invention.

FIG. 3 shows one example method wherein a controller or group of controllers gather sensor (e.g., radar and camera) data, location data (e.g., GPS coordinates), and template data for targeted infrastructure assets in step 35 while the vehicle is moving along a roadway. Location data may be used to search a database of particular infrastructure assets which have been previously detected and stored. By comparing a current geographic location of the vehicle with the database of known infrastructure assets (e.g., including the coordinates of a geofencing region around the known assets), steps for detecting and classifying the identity of particular assets can be avoided for assets that were previously detected and stored. The sensor data gathered in step 35 may include UWB radar data and/or optical or infrared image data for purposes of infrastructure asset detection and recognition. The template data that is gathered in step 35 may include spatial signatures of various known types of infrastructure assets (e.g., fire hydrants, utility poles, manhole covers, etc.) of potential interest to the user of the vehicle or of interest to emergency service providers or utility companies, for example. A check is performed in step 36 to determine whether any infrastructure asset is present in the interrogated region around the vehicle (e.g., within a detection range of the radar transceiver and/or optical image sensor) by attempting to match spatial signatures (e.g., radar mapping or image data) with the template data. If no infrastructure asset is yet detected, then the method continues to monitor for relevant data in step 35.

If an infrastructure asset is detected in step 36, then an optional function of the invention may include a check being performed in step 37 to determine whether the user has requested navigational assistance for maneuvering the vehicle into a desired alignment with the asset. If so, then guidance is provided in step 38 so that the vehicle can be driven (either manually or automatically) to the optimal position with respect to the infrastructure asset. A controller may be configured to generate vehicle navigation commands to locate the vehicle in a predetermined alignment with the detected infrastructure asset in response to a navigation request from the user. For example, when the infrastructure asset is a hydrant and the vehicle is a fire truck, a location on the truck carrying a hose can be brought into close proximity with the hydrant to facilitate coupling of the hose.

If there is no navigation request in step 37 (or optionally after providing guidance in step 38), the method proceeds with an analysis of potential obstructions surrounding the infrastructure asset that has been identified. In step 39, data is gathered including sensor data (e.g., camera image data and/or radar data), template data characterizing the properties of various kinds of obstructions (e.g., spatial or other signatures of snow, ice, leaves, etc.), regulatory data, and/or predictive data. Regulatory data may include details of the areas around certain types of infrastructure assets that are required to be kept unobstructed (e.g., a maximum allowable depth of snow within a prescribed radius around the asset). A threshold may be selected according to a type of infrastructure represented by the detected infrastructure asset. Predictive data may include weather forecasts which imply that a certain depth of snow may be expected to accumulate around a specific asset based on its location, for example.

Using object detection (e.g., image recognition), a severity of an obstruction around an infrastructure asset is estimated in step 40 and checked against a threshold. For example, when the asset is a fire hydrant and the obstruction is snow, then a corresponding regulation may imply a threshold comprised of a predetermined snow depth within a predetermined distance of the hydrant. More generally, the severity may be estimated according to a height of the obstruction within a predetermined distance from the detected infrastructure asset. If the estimated severity of the obstruction is not greater than the threshold, then step 40 detects that there is no excess obstruction, and the method ends at step 41. If the estimated severity of the obstruction is greater than the threshold, then a message is sent in step 42 to the user in order to inform them of the excess obstruction so that remedial action can be taken. For example, an alert message may be sent to a mobile device of the user via a smartphone app to identify the infrastructure asset and the excess obstruction.

Figure 4:
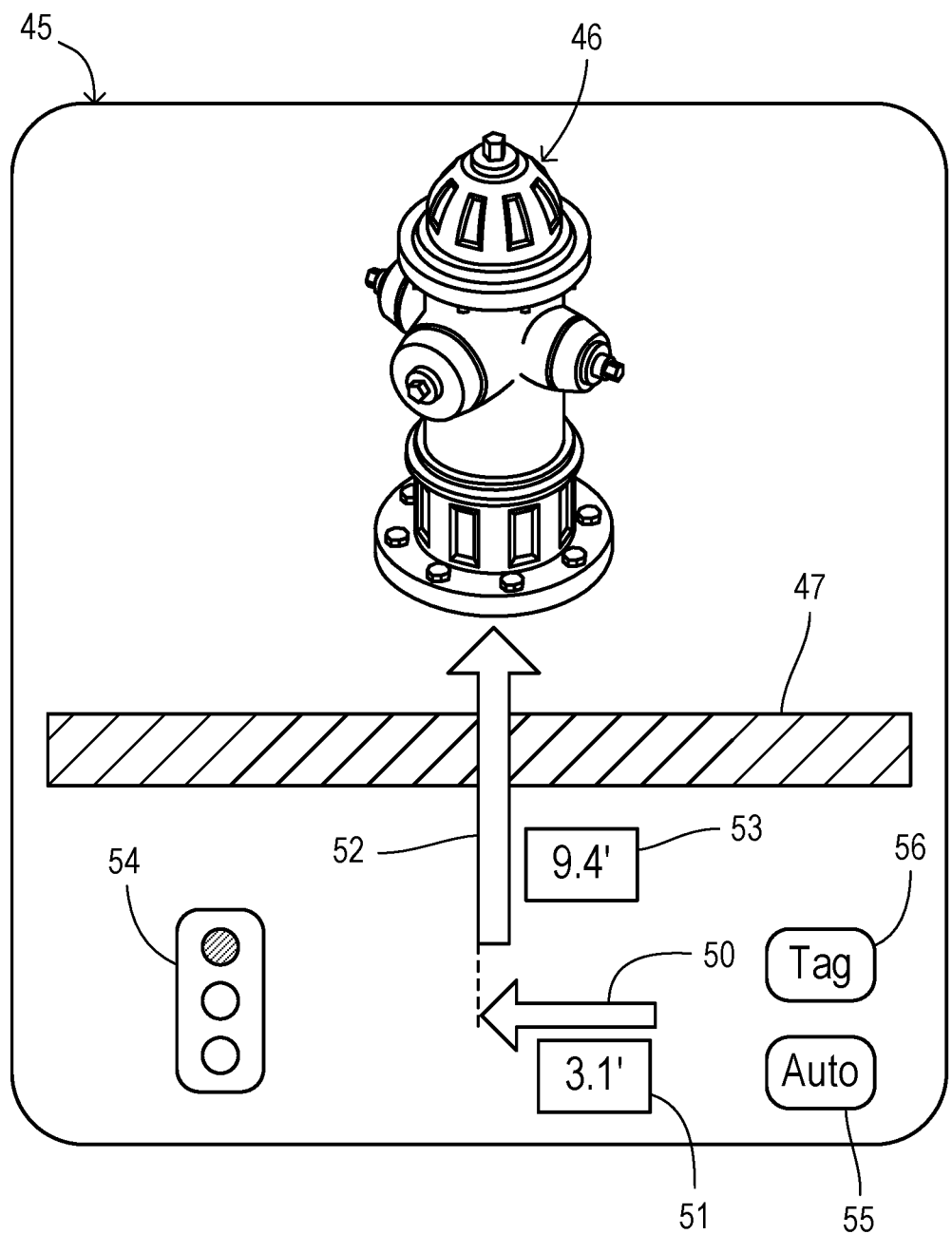
FIG. 4 is a graphic depiction of a display screen for guiding a vehicle into close proximity with an infrastructure asset.

FIG. 4 shows an HMI display 45 for assisting a user (e.g., driver) with the task of moving a vehicle to a desired alignment with and distance from an infrastructure asset 46. Display 45 shows asset 46 as a hydrant alongside of a curb or shoulder 47 of a roadway. A forward positioning arrow 50 and a distance window 51 depict a forward/backward distance offset between asset 46 and a predetermined reference point of the vehicle (e.g., a door of the vehicle or a position of an element on the vehicle meant to interact with the asset). A lateral positioning arrow 52 and a distance window 53 depict a lateral distance offset between asset 46 and a predetermined reference point of the vehicle (e.g., a passenger side of the vehicle). During movement, distance windows 51 and 53 may be updated with current values (e.g., derived from radar data, camera data, or other sensor data such as from ultrasonic sensors). Arrows 50 and 52 may change in size as the corresponding distances become greater or smaller. A proximity icon 54 can also be provided which may display different colors according to the remaining distance as the vehicle moves toward the desired alignment (e.g., going from green to yellow to red as the distance decreases).

Display 45 may also include an icon 55 for selecting an autonomous mode of alignment. By tapping Auto icon 55, the user can request that the vehicle take over automatic control in order to maneuver itself to the desired location.

Display 45 may also include a Tag icon 56 for the purpose of allowing the user to indicate that the infrastructure asset which has been detected should be saved in the database for future monitoring. The tagging of an asset may be comprised of storing a geofence zone comprising a boundary around the detected infrastructure asset together with an identification of the detected infrastructure. After the geofence zone is stored, when the vehicle re-encounters the geofence zone in the future then the controller can automatically assess the perimeter around the detected infrastructure asset to estimate a severity of any obstructions blocking the infrastructure asset without having to first detect the infrastructure asset.

Figure 5:
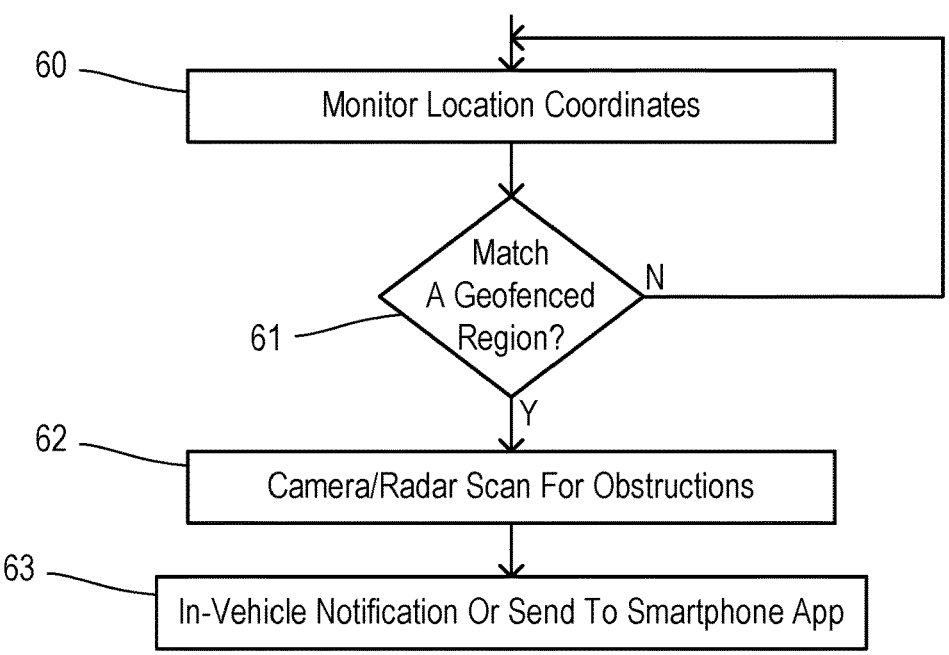
FIG. 5 is a flowchart showing another method of the invention.

FIG. 5 shows a method using geofencing wherein the moving vehicle continuously monitors its location coordinates in step 60 (e.g., using a GPS receiver). In step 61, a check is performed to determine whether the vehicle coordinates match any geofenced region. If not, then a return is made to step 60. Otherwise, the location of the infrastructure asset within the geofenced region is scanned for obstructions in step 62. The scanning may be comprised of gathering camera and/or radar data, for example. Whenever problematic obstructions are detected, then a in-vehicle notification or a wireless message to a portable device of the user is sent in step 63.

What is claimed is:

1. An apparatus for a vehicle comprising:
a surface penetrating radar transceiver configured to interrogate a region adjacent a pathway of the vehicle in response to activation by a user;
an object detection system responsive to the radar transceiver configured to recognize one or more spatial signatures of one or more detected objects in the region;
a controller coupled to the radar transceiver and the object detection system, wherein the controller is configured to (i) compare a respective spatial signature of at least one of the detected objects to a plurality of predetermined target signatures to detect an infrastructure asset, (ii) assess a perimeter around the detected infrastructure asset to estimate a severity of a tangible obstruction blocking the infrastructure asset, and (iii) convey a continuous alert message to the user when the estimated severity is greater than a threshold, wherein the alert message continuously alerts the user based on continuous detecting, localizing, and monitoring of the infrastructure in relation to a specific location on the vehicle.

2. The apparatus of claim 1 further comprising:
a camera capturing an image directed to the detected infrastructure asset;
wherein the object detection system is configured to recognize the obstruction in response to the captured image.

3. The apparatus of claim 2 wherein the severity is estimated according to a height of the obstruction within a predetermined distance from the detected infrastructure asset.

4. The apparatus of claim 3 wherein controller is configured to select the threshold according to a type of infrastructure represented by the detected infrastructure asset.

5. The apparatus of claim 1 wherein the controller is further configured to generate vehicle navigation commands to locate the vehicle in a predetermined alignment with the detected infrastructure asset in response to a navigation request from the user.

6. The apparatus of claim 1 further comprising:
a location tracking system configured to determine geographic coordinates of the vehicle;
wherein the controller is further configured to (iv) store a geofence zone comprising a boundary around the detected infrastructure asset together with an identification of the detected infrastructure, and (v) automatically assess the perimeter around the detected infrastructure asset to estimate a severity of a further obstruction blocking the infrastructure asset when the vehicle re-encounters the geofence zone.

7. The apparatus of claim 1 wherein the alert message is transmitted wirelessly to a portable communication device of the user.

8. The apparatus of claim 1 wherein the alert message is conveyed to the user via a display screen in the vehicle.

9. The apparatus of claim 1 wherein the surface penetrating radar transceiver is comprised of an ultra-wideband (UWB) radar transceiver.

10. The apparatus of claim 1 wherein the surface penetrating radar transceiver further performs a blind spot monitoring function.

11. The apparatus of claim 1 wherein the surface penetrating radar transceiver further performs a cross traffic alert function.

12. A method comprising the steps of:
   interrogating with a surface penetrating radar transceiver a region adjacent a pathway of a vehicle driven by a user in response to a user activation;
   recognizing, based on radar data received from the surface penetrating radar receiver, one or more spatial signatures of one or more detected objects in the region;
   comparing a respective spatial signature of at least one of the detected objects to a plurality of predetermined target signatures to detect an infrastructure asset;
   assessing a perimeter around the detected infrastructure asset to estimate a severity of a tangible obstruction blocking the infrastructure asset; and
   conveying a continuous alert message to the user when the estimated severity is greater than a threshold, wherein the alert message continuously alerts the user based on continuous detecting, localizing, and monitoring of the infrastructure in relation to a specific location on the vehicle, and wherein the alert message indicates when clearing of the tangible obstruction or repositioning the vehicle is needed for the user to access the infrastructure asset.

13. The method of claim 12 further comprising the step of:
   capturing a camera image directed to the detected infrastructure asset;
   wherein the assessing step is comprised of recognizing the obstruction in response to the captured camera image.

14. The method of claim 13 wherein the severity is estimated according to a height of the obstruction within a predetermined distance from the detected infrastructure asset.

15. The method of claim 12 further comprising the step of selecting the threshold according to a type of infrastructure represented by the detected infrastructure asset.

16. The method of claim 12 further comprising the step of:
   generating vehicle navigation commands to locate the vehicle in a predetermined alignment with the detected infrastructure asset in response to a navigation request from the user.

17. The method of claim 12 further comprising the steps of:
   tracking geographic coordinates of the vehicle;
   storing a geofence zone comprising a boundary around the detected infrastructure asset together with an identification of the detected infrastructure; and
   automatically assessing the perimeter around the detected infrastructure asset to estimate a severity of a further obstruction blocking the infrastructure asset when the vehicle later re-encounters the geofence zone.

18. The method of claim 12 wherein the step of conveying the alert message is comprised of transmitting the alert message wirelessly to a portable communication device of the user.

19. The method of claim 12 wherein step of conveying the alert message is comprised of displaying the alert message to the user on a display screen in the vehicle.

20. The method of claim 12 wherein the surface penetrating radar transceiver is comprised of an ultra-wideband (UWB) radar transceiver.

* * * * *